United States Patent
Denkewicz, Jr. et al.

[11] Patent Number: 6,019,893
[45] Date of Patent: Feb. 1, 2000

[54] WATER PURIFIER FOR A SPA

[75] Inventors: Raymond P. Denkewicz, Jr., Warwick; John D. Rafter, Providence; Mark A. Bollinger, Warwick, all of R.I.

[73] Assignee: Fountainhead Technologies, Inc., Smithfield, R.I.

[21] Appl. No.: 09/107,427

[22] Filed: Jun. 30, 1998

Related U.S. Application Data

[62] Division of application No. 08/686,844, Aug. 1, 1996, Pat. No. 5,779,913.

[51] Int. Cl.[7] ...................................................... E04H 4/14
[52] U.S. Cl. .......................... 210/167; 210/169; 210/205; 210/206; 210/209; 210/232; 210/237; 210/241
[58] Field of Search ..................................... 210/167, 169, 210/198.1, 205, 206, 209, 232, 237, 241

[56] References Cited

U.S. PATENT DOCUMENTS

| | | |
|---|---|---|
| 3,839,202 | 10/1974 | Roy . |
| 4,241,025 | 12/1980 | Grayson et al. . |
| 4,257,893 | 3/1981 | Burton .................................... 210/169 |
| 4,385,989 | 5/1983 | Margolis ................................. 210/169 |
| 4,416,854 | 11/1983 | Nielsen . |
| 4,420,463 | 12/1983 | Pocius et al. . |
| 4,519,914 | 5/1985 | Etani . |
| 4,584,106 | 4/1986 | Held ....................................... 210/169 |
| 4,610,783 | 9/1986 | Hudson . |
| 4,780,197 | 10/1988 | Schuman . |
| 4,816,177 | 3/1989 | Nelson et al. . |
| 4,817,214 | 4/1989 | Stuessy . |
| 4,867,196 | 9/1989 | Zetena et al. . |
| 4,876,003 | 10/1989 | Casberg . |
| 4,928,813 | 5/1990 | Casberg . |
| 5,011,600 | 4/1991 | Mowka, Jr. et al. .................... 210/169 |
| 5,062,951 | 11/1991 | Tominaga ................................ 210/169 |
| 5,066,408 | 11/1991 | Powell . |
| 5,076,315 | 12/1991 | King . |
| 5,124,032 | 6/1992 | Newhard . |
| 5,149,354 | 9/1992 | Delaney . |
| 5,332,511 | 7/1994 | Gay et al. . |
| 5,352,369 | 10/1994 | Heinig, Jr. . |
| 5,389,345 | 2/1995 | Renton . |
| 5,599,454 | 2/1997 | Heskett . |
| 5,656,159 | 8/1997 | Spencer et al. . |

OTHER PUBLICATIONS

Abstract of Japanese Patent Document No. 02 213350A dated Aug. 24, 1990.
Abstract of Japanese Patent Document No. 60 183086A dated Sep. 18, 1985.
International Search Report for PCT/US97/13287 mailed Dec. 4, 1997.
Rainbow Plastics Brochure, Entitled "Lifeguard DSF Chlorine/Bromine Dispenser", two pages; copyright 1987).
Two photographs of a product marked "Waterway" and "Brominator."
Pp. 1, 19, and 22 of what purports to be the "Waterway 1992 Catalog".

*Primary Examiner*—Peter A. Hruskoci
*Assistant Examiner*—Betsey J. Morrison
*Attorney, Agent, or Firm*—Dean W. Russell; Kilpatrick Stockton LLP

[57] ABSTRACT

A water purifier includes a housing that contains a purification material for purifying the water. The water purifier is placed a flow of circulating water in the spa. The purification material preferably can be a silver-containing material.

36 Claims, 5 Drawing Sheets

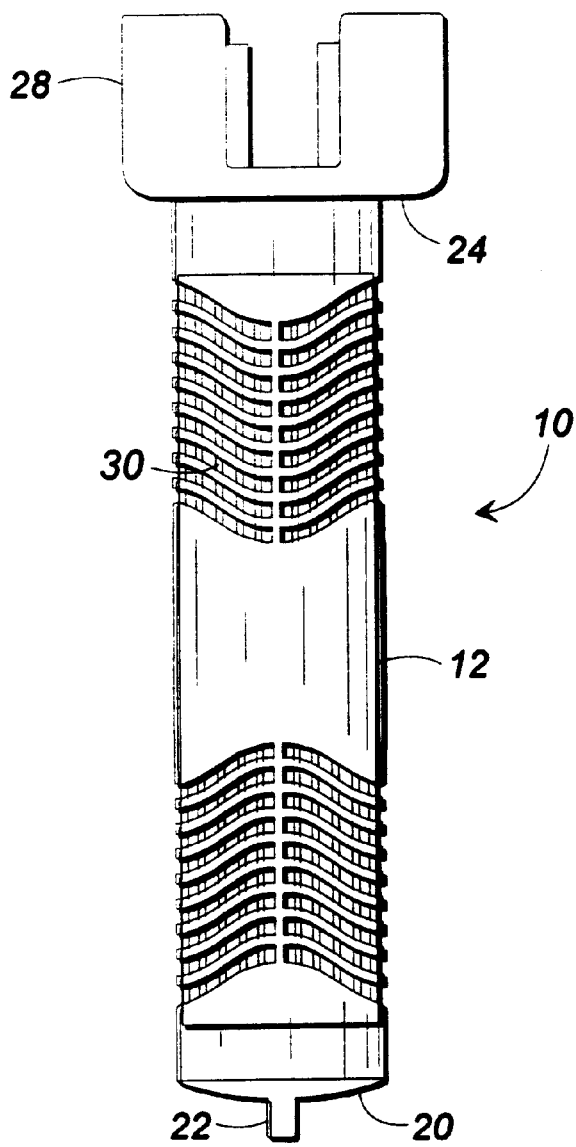
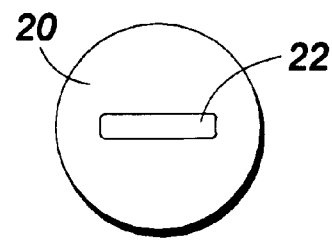
FIG. 4          FIG. 5

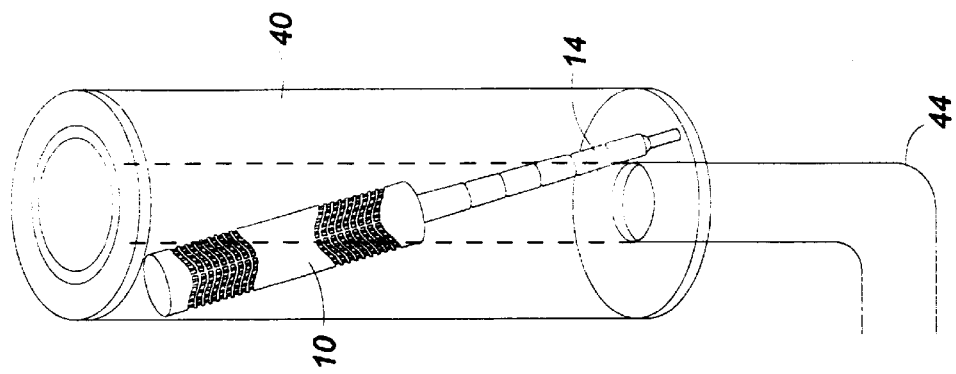
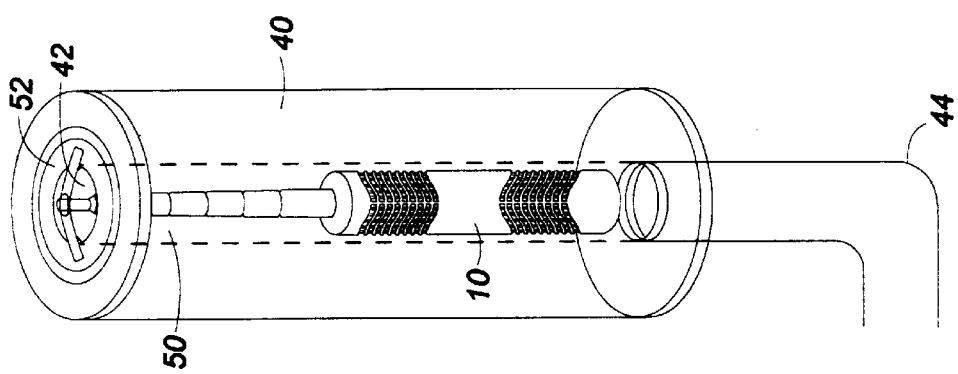
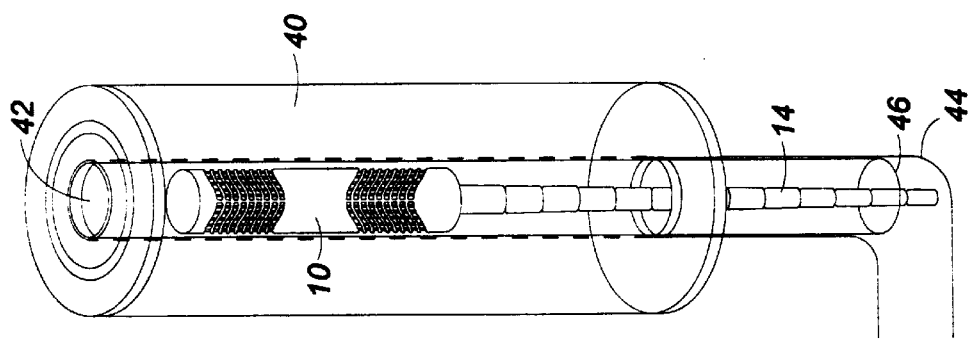
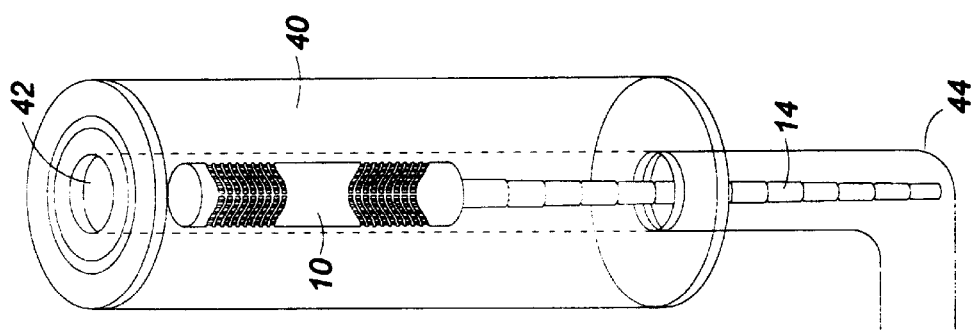

WATER PURIFIER FOR A SPA

This application is a division of U.S. patent application Ser. No. 08/686,844, filed Aug. 1, 1996 (now U.S. Pat. No. 5,779,913).

BACKGROUND OF THE INVENTION

The invention relates to water purifiers.

A spa is a small pool used for bathing or hydrotherapy in which water is heated and circulated. A typical spa has a volume of less than about 1,500 gallons. The spa can include hydrotherapy jet circulation, hot water/cold water mineral baths, air induction bubbles, or combinations thereof. Other common terminology for spas includes hydrotherapy pools, therapeutic pools, whirlpools, hot spas, hydrotherapy spas, or hot tubs.

Generally, the water in the spa is not drained, cleaned or refilled for each individual bather. Thus, it often is desirable to have a reliable water purification system for the spa. The water in a spa can be purified, for example, by adding chlorine to kill microorganisms that thrive in the warm water. The spa water is typically filtered as it is circulated.

SUMMARY OF THE INVENTION

The present invention features a water purifier for purifying water in a spa. In general, the water purifier includes a housing having a diameter of less than 2 inches, an internal volume that is between 30 and 200 cubic centimeters, and openings that permit water to enter and exit the housing. The water purifier contains a purification material within the internal volume of the housing that purifies water in contact with the material.

The preferred housing is cylindrical and has a length less than 8 inches, more preferably less than 7 inches. The internal volume of the housing is preferably between 50 and 150 cubic centimeters.

The water purifier preferably includes a support attached to the housing that causes the housing to be retained in a flow of circulating water in the spa. The housing can be supported within the spa filter core or in a recessed area on the underside of the spa skimmer basket located in the circulation system of the spa. The means for supporting can be a stem, umbrella, t-shaped apparatus, or other arrangement capable of retaining the housing within the spa filter core, or a press fitting for attaching to the underside of the skimmer basket.

Preferably, the stem is less than 12 inches long and is removable from the housing. The stem is preferably sectioned to facilitate adjusting the length of the stem (and overall length of the water purifier) for the particular spa filter core. Most preferably, the stem is composed of an upper piece that is 6 inches long and a lower piece that is 5 inches long that fit together via a friction fitting to form a stem that is 10.5 inches long.

The purification material preferably can be a silver-containing ceramic material, for example, a composition including silver, an aluminum oxide, and zinc.

The water purifier can provide one or more of the following advantages. Since the water purifier can be directly inserted into the core of the spa filter or attached to the underside of the skimmer basket of the spa, the water purifier can be used without modification of the plumbing system of the spa. When installed properly in the core of the spa filter, the preferred water purifier exerts little or no back-pressure on the filter as water is circulated. The water purifier can be used in spas regardless of water flow rate.

In addition, when the purification material is a silver-containing material, the water can be effectively purified using oxidizing agents other than chlorine alone (e.g., potassium peroxymonosulfate, ozone, or a combination thereof). The purification material and water purifier are not adversely affected by the heat of the water in the spa.

The water purifier is suitable for purifying water in spas having volumes of less than about 1,500 gallons. It is preferred that the water purifier receive filtered water.

The term "circulated," as used herein, means continuous flow of the water to expose the water to the water purifier, for example, as it is pumped through a filter. The circulated water passes through the skimmer of the spa and the spa filter core.

Other advantages and features of the invention will be apparent from the description of the preferred embodiment, and from the claims.

BRIEF DESCRIPTION OF THE DRAWINGS

FIG. 4 is a side plan view of a second water purifier.

FIG. 5 is an end view of one end of the water purifier.

FIG. 6 is an end view of the other end of the water purifier.

FIG. 7 is a view of a spa filter core including the water purifier.

FIG. 8 is a view of a second spa filter core including the water purifier.

FIG. 9 is a view of a spa filter core including a third water purifier.

FIG. 10 is a view of a third spa filter core including the water purifier.

DETAILED DESCRIPTION

Referring to FIGS. 1–4, water purifier 10 has a housing 12 that is cylindrical and has a diameter of 1.25 inches and a length of 6.5 inches. Housing 12 has an internal volume of about 70 cubic centimeters for containing the purification material. Housing 12 has openings 30 that permit water to enter and exit the housing and the internal volume. When water enters and exits the housing, the water contacts the surface of the purification material. Support stem 14 is attached to one end of housing 12 which causes housing 12 to be retained within a spa filter core once the water purifier is placed in the filter core. Water purifier 10 generally can be made of a plastic or other suitable material, like PVC, polyethylene, polyacetal, polypropylene, glass filled polypropylene, talc filled polypropylene, or other moldable plastics. Suitable plastics have good chemical resistance (e.g., toward oxidation), good heat resistance (e.g., up to about 110° F), and good bending strength. The preferred water purifier 10 can withstand flow rates of 175 gallons per minute in a spa filter core at 110° F.

Figure 1:
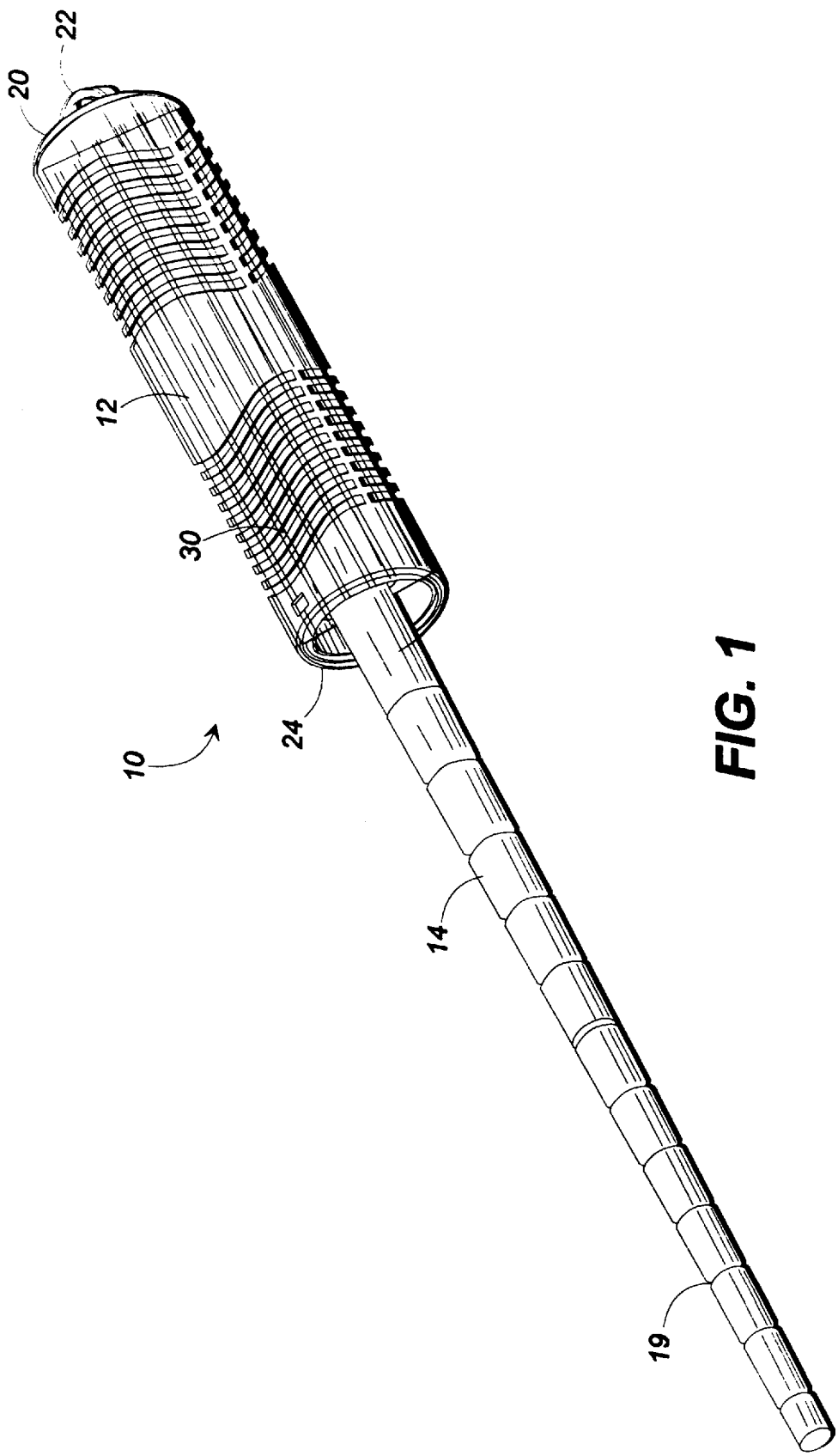
FIG. 1 is a perspective view of a water purifier.
Figure 2:
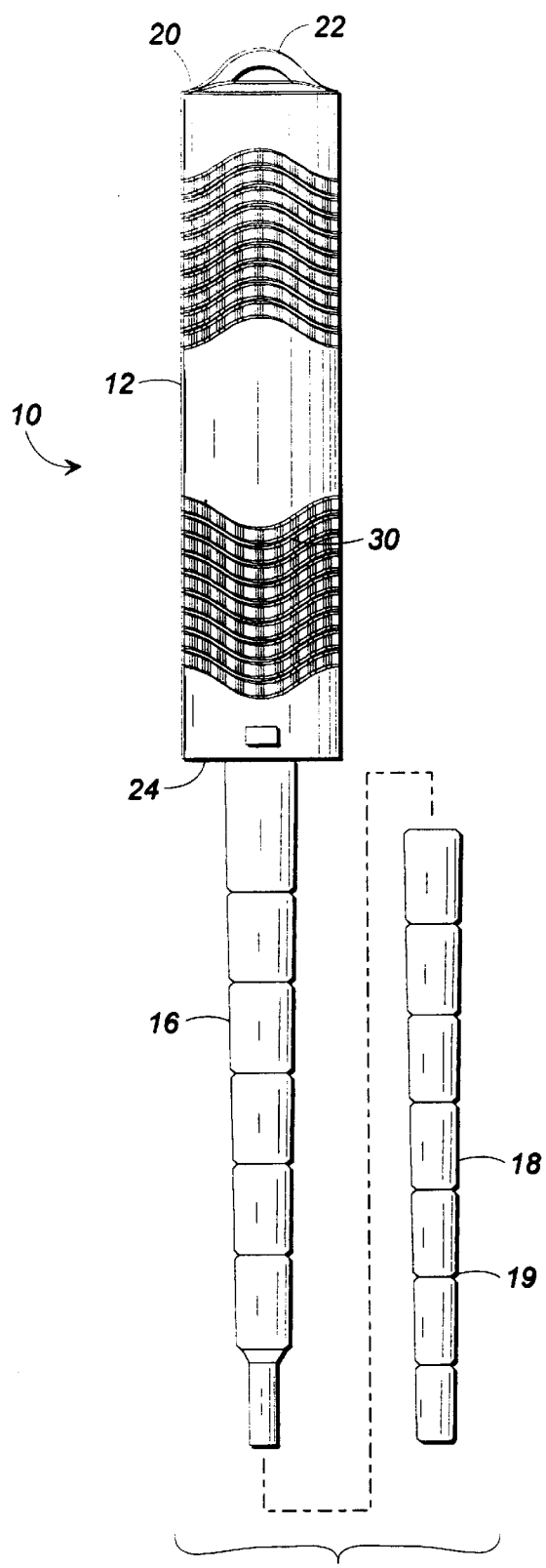
FIG. 2 is a side plan view of the water purifier.
Figure 3:
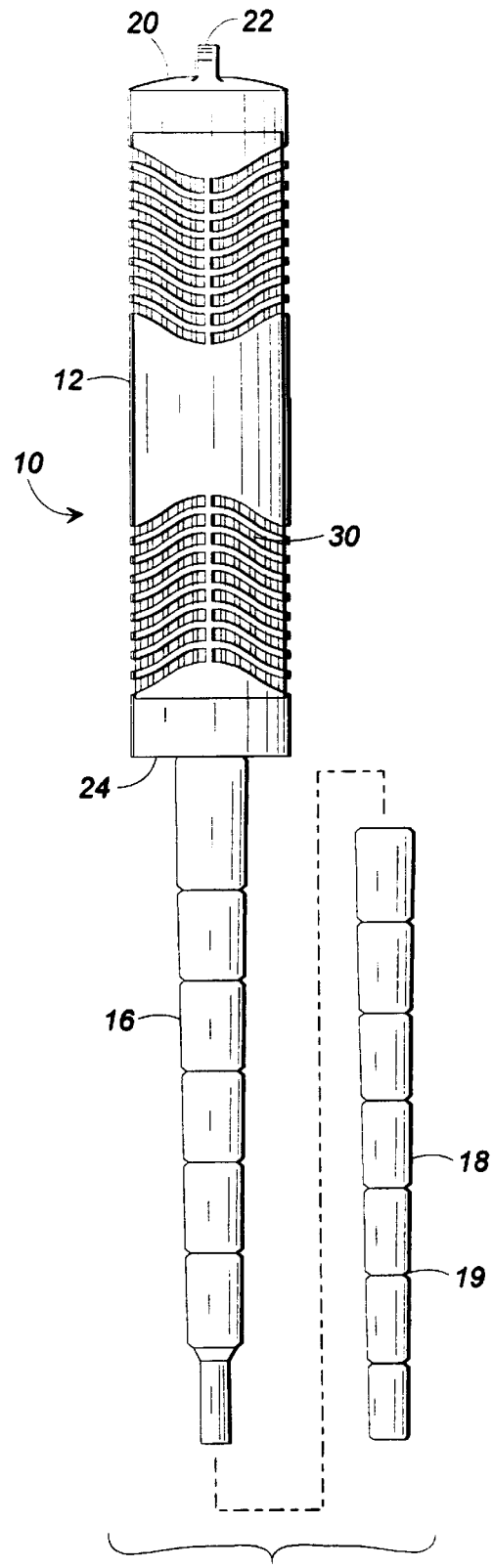
FIG. 3 is a side plan view of the water purifier, perpendicular to that shown in FIG. 2.

Referring to FIGS. 1–3, support stem 14 is composed of upper stem 16 and lower stem 18 which are removably-attached by a friction fitting at the end of upper stem 16. Support stem 14 is 10.5 inches long, although the length of the stem can be adjusted. Lower stem 18 can be removed from the structure to adjust the position of water purifier 10 in the spa filter core. Alternatively, the length of support stem 14 can be adjusted by cutting off a portion of the stem at a serrated section 19 along the length of support stem 14. It is preferred that the stem material be brittle enough to allow the length to be adjusted by breaking at the serrations.

Referring to FIG. 4, an alternate water purifier 10 has a friction fitting 28 that attaches to the underside of a skimmer basket located on an end of housing 12.

Referring to FIGS. 1–6, housing 12 has top 20 which includes loop 22. Loop 22 simplifies retrieval of water purifier 10 from the core of the spa filter by providing an accessible area to grasp or hook. Housing 12 also has bottom 24 which includes knob 26. Knob 26 provides a location for removably-attaching support stem 14 to housing 12 by way of a friction fitting. Removable-attachment of support stem 14 to housing 12 permits the housing containing the purification material alone to be placed in more confined locations of the spa water to purify the water.

Referring to FIGS. 7–11, water purifier 10 is supported in a flow of circulating water in the spa within spa filter core 40 or on the underside of a skimmer basket 50. Water is circulated through filter core 40 or skimmer basket 50 and contacts water purifier 10. In contacting water purifier 10, the water is exposed to purification material contained within housing 12.

In open top spa filter cores, as shown in FIGS. 7–9, water purifier 10 is installed by passing water purifier 10 through filter opening 42 in the top of filter core 40. Water purifier 10 is retained within filter core 40 by resting on support stem 14 which extends into pipe 44 at the base of filter core 40. The length of support stem 14 is sufficient to suspend the housing at least 1 inch above the bottom of filter core 40. As mentioned above, the length of support stem 14 can be adjusted accordingly.

Referring to FIG. 8, filter core 40 can contain stand pipe 46 running the length filter core 40 and extending into pipe 44. Water purifier 10 can be placed within standpipe 46 in this filter configuration.

Referring to FIG. 9, an alternate water purifier 10 has a support 50 attached to the top of water purifier 10 that retains the water purifier within filter core 40 by suspending it from the top of the filter core. The support 50 has an expanding section 52 that has a width that is greater that the diameter of filter opening 42. Support 50 can be attached at either end of housing 12 to loop 22 by, for example, a hook or knob 26 by, for example, a friction fitting.

Referring to FIG. 10, water purifier 10 can be used in closed top spa filter systems. In a closed top system, water purifier 10 is inserted from the bottom and is positioned to rest on a shelf on the inside of filter core 40. Since support stem 14 does not extend into pipe 44 in this filter system, stem 14 is shortened (e.g. upper section 16 is used alone) to retain water purifier 10 in the proper position in filter core 40.

Figure 11:
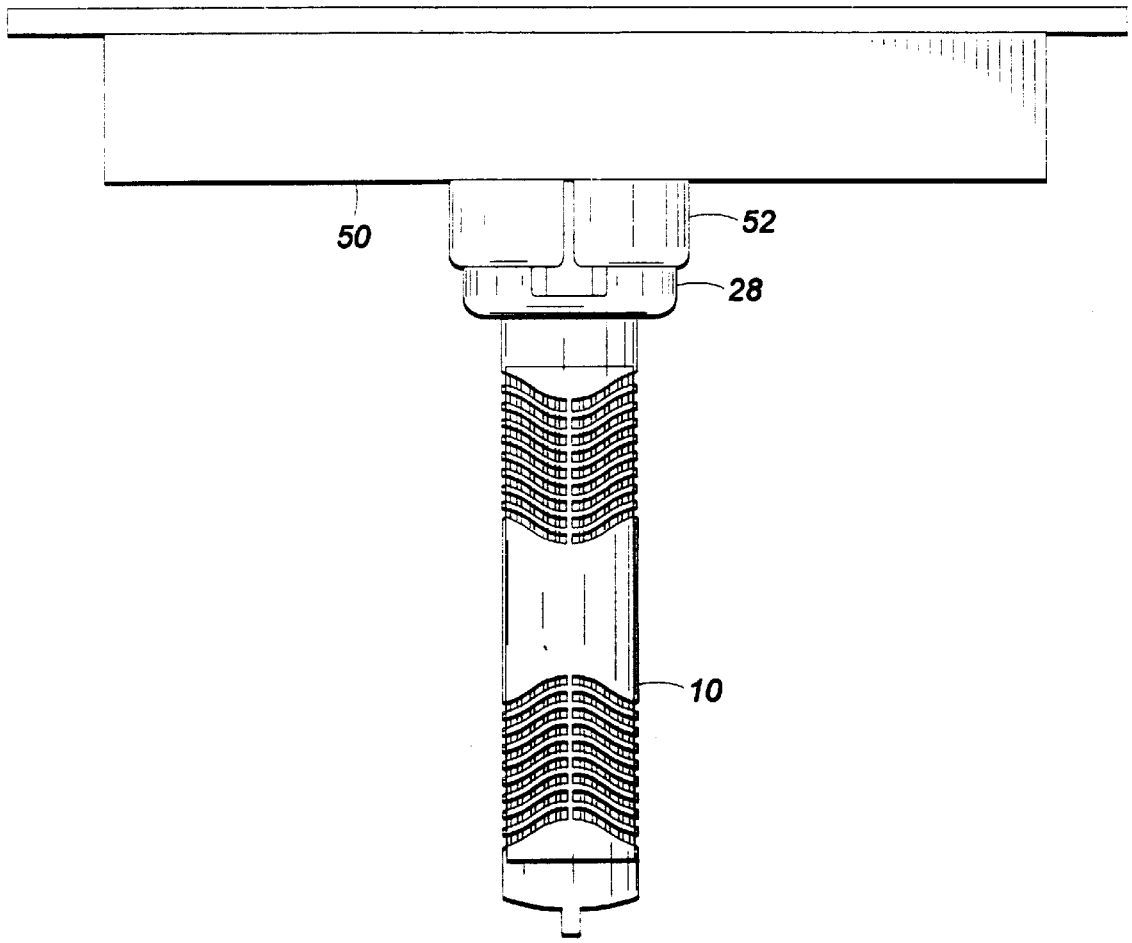
FIG. 11 is a view of a skimmer basket including the second water purifier.

Referring to FIG. 11, an alternative water purifier 10 can be attached to skimmer basket 50 by inserting friction fitting 28 into recess 52 located on the underside of skimmer basket 50. Skimmer basket 50 and water purifier 10 is placed in the spa skimmer where water purifier 10 is exposed to the flow of circulating water in the spa.

The preferred purification materials are described, for example, in U.S. Pat. No. 5,352,369 and in U.S. Ser. No. 08/628,405, entitled "Self-Regulating Water Purification Composition" and filed Apr. 5, 1996, which are incorporated herein by reference. Examples of these purification materials include silver metal on a support. The support can be a ceramic and can include an inorganic oxide, e.g., an aluminum oxide. The silver can be chemically deposited on the ceramic support or dispersed as a powder, shavings, or turnings with the ceramic support. The preferred silver content of the purification material is between 0.1 and 10 weight percent. The purification material can include a second metal, preferably zinc, copper, aluminum, iron, or manganese, most preferably, zinc.

The purification material is preferably formed into particles larger than the individual openings 30 in the water purifier, e.g., as pellets or as a monolithic foam, so that the material is adequately contained within housing 12. Alternatively, the purification material can be contained in a porous container, for example, a mesh bag.

It is preferred that the purification material be used in the presence of oxidizing agents dissolved in the water, such as, for example, ozone, low levels of chlorine (less than about 1 ppm), or potassium peroxymonosulfate (less than about 30 ppm), or combinations thereof.

In addition to acting as an anti-microbial agent, the purification material can effectively remove metal ions, such as mercury, lead, cadmium, iron, manganese, copper, nickel, chromium, barium, and arsenate, particularly when the purification material includes silver, an inorganic oxide such as alumina, and zinc. When zinc is included in the purification material, zinc ions can be released into the water which enhance disinfection of the water and provide algaestatic properties.

Other embodiments are within the claims.

What is claimed is:

1. A water purifier for killing bacteria in water in a spa, comprising:
    a housing having (i) an end and (ii) openings that permit water to enter and exit said housing; and
    a support comprising a stem extending from the end of said housing that, when placed in a flow of circulating water located in a filter core in said spa, causes said housing to be retained within said flow of circulating water.

2. The water purifier of claim 1, further comprising a purification material that kills bacteria in water contained in an internal volume of said housing.

3. The water purifier of claim 2, wherein said purification material includes silver and zinc.

4. The water purifier of claim 1, wherein said housing is cylindrical.

5. The water purifier of claim 4, wherein said cylindrical housing has a length of less than 8 inches.

6. The water purifier of claim 1, wherein said housing has a diameter less than two inches and an internal volume between 30 and 200 cubic centimeters.

7. The water purifier of claim 1, wherein said stem is less than 12 inches long.

8. The water purifier of claim 1, wherein said stem is removable from said housing.

9. The water purifier of claim 1, wherein said stem is sectioned.

10. A water purifier for killing bacteria in water in a spa, comprising:
    a housing having (i) an internal volume and (ii) openings that permit water to enter and exit said housing;
    a support attached to said housing that, when placed in a flow of circulating water in said spa, causes said housing to be retained within said flow of circulating water; and
    a purification material including silver and a ceramic which kills bacteria in water contained in said internal volume of said housing.

11. A water purifier for killing bacteria in water in a spa, comprising:
   a housing having (i) an end and (ii) openings that permit water to enter and exit said housing; and
   a support attached to said housing that, when placed in a flow of circulating water in said spa, causes said housing to be retained within said flow of circulating water, said support being a fitting extending from the end of said housing for a recess in a skimmer basket and said flow of circulating water is located in a spa skimmer.

12. A device for purifying circulating water, comprising:
   a. a housing containing a water-purification material and defining (i) an end and (ii) a plurality of openings, which openings permit the circulating water to enter and exit the housing and contact the water-purification material while within the housing; and
   b. a removable stem connected to and extending from the end of the housing for positioning the housing in the flow of circulating water, the removable stem having a length and a diameter which decreases along the length in a direction moving away from the end of the housing.

13. A device according to claim 12 in which the housing further defines a recess into which the removable stem is fitted.

14. A device according to claim 12 in which the removable stem comprises separate upper and lower portions attachable through a friction fitting.

15. A device according to claim 14 in which at least one of the upper and lower portions of the removable stem includes at least one serration and is sufficiently brittle to allow a user to adjust the length of the removable stem by breaking the serrated portion.

16. A device according to claim 12 in which the length of the stem is adjustable.

17. A device for purifying water in a spa having a filter with a core, comprising:
   a. a housing defining (i) first and second ends, the first end having a loop integrally formed therewith, and (ii) a plurality of openings through which water may enter and exit the housing;
   b. an elongated support for connection to the second end; and
   c. water-purification material contained within the housing.

18. A device according to claim 17 in which (i) the second end has a knob-integrally formed therewith and (ii) the elongated support comprises a stem detachably connected to the knob.

19. A device according to claim 17 in which the housing is cylindrical and of diameter sufficiently small to allow it to be placed within the core of the filter of the spa.

20. A device according to claim 19 in which the elongated support has a length substantially greater than the diameter of the housing and a width substantially less than the diameter of the housing.

21. A device according to claim 17 in which the water-purification material comprises a plurality of silver-containing pellets.

22. A device according to claim 17 in which the openings are elongated.

23. A device for purifying water in a spa having a filter with a core, comprising:
   a. a cylindrical housing defining (i) an end having a knob integrally formed therewith; (ii) a plurality of openings through which water may enter and exit the housing; and (iii) a diameter sufficiently small to allow it to be placed within the core of the filter of the spa;
   b. at least one water-purification pellet contained within the housing, such pellet comprising either or both of a silver-containing material or a zinc-containing material; and
   c. a stem detachably connected to the knob and having a length substantially greater than the diameter of the housing and a width substantially less than the diameter of the housing.

24. A device for purifying water in a spa having a filter with a core, comprising:
   a. a cylindrical housing defining (i) a plurality of openings through which water may enter and exit the housing; and (ii) a diameter sufficiently small to allow it to be placed within the core of the filter of the spa;
   b. at least one water-purification pellet contained within the housing, such pellet comprising a zinc-containing material; and
   c. a stem connected to the housing and having a length substantially greater than the diameter of the housing and a width substantially less than the diameter of the housing.

25. A device for purifying water in a spa having a filter with a core, comprising:
   a. a housing defining (i) a plurality of elongated openings through which water may enter and exit the housing; (ii) first and second ends, the first end having a loop integrally formed therewith; and (iii) a diameter sufficiently small to allow it to be placed within the core of the filter of the spa;
   b. a plurality of water-purification pellets contained within the housing, at least some of such pellets comprising a zinc-containing material and at least some of such pellets comprising a siiver-containing material, and
   c. a stem connected to the second end of the housing, having a length substantially greater than the diameter of the housing and a width substantially less than the diameter of the housing, and including at least one serration so as to be adapted to be cut to a desired length.

26. A device for purifying circulating water, comprising:
   a. a housing containing a water-purification material and defining (i) an end and (ii) a plurality of openings, which openings permit the circulating water to enter and exit the housing and contact the water-purification material while within the housing; and
   b. a removable stem having an adjustable length and connected to and extending from the end of the housing for positioning the housing in the flow of circulating water.

27. A device according to claim 26 in which the removable stem comprises separate upper and lower portions attachable through a friction fitting.

28. A device according to claim 27 in which at least one of the upper and lower portions of the removable stem includes at least one serration and is sufficiently brittle to allow a user to adjust the length of the removable stem by cutting or breaking the serrated portion.

29. A device according to claim 26 in which the housing has an internal volume that is between 30 and 200 cubic centimeters.

30. A device according to claim 29 in which the removable stem is less than twelve inches long.

31. A device according to claim 26 in which the removable stem is less than twelve inches long.

32. A device according to claim 26 in which the housing has a diameter of less than two inches.

33. A device according to claim 32 which the housing is cylindrical.

34. A device according to claim 26 in which the water-purification material comprises a zinc-containing material.

35. A device according to claim 26 in which the water-purification material comprises a silver-containing material.

36. A device according to claim 35 in which the water-purification material further comprises a zinc-containing material.

* * * * *